US007432856B1

(12) United States Patent
Hornbostel et al.

(10) Patent No.: US 7,432,856 B1
(45) Date of Patent: Oct. 7, 2008

(54) SIGNAL SIMULATION DEVICE

(75) Inventors: Achim Hornbostel, Herrsching (DE);
Arno Schroth, München (DE); Andriy Konovaltsev, Gilching (DE); Alexander Steingass, Gilching (DE); Andreas Eckardt, Berlin (DE); Holger Venus, Berlin (DE)

(73) Assignee: Deutsches Zentrum für Luft- und Raumfahrt e.V., Köln (DE)

( * ) Notice: Subject to any disclaimer, the term of this patent is extended or adjusted under 35 U.S.C. 154(b) by 253 days.

(21) Appl. No.: 11/406,936

(22) Filed: Apr. 19, 2006

(30) Foreign Application Priority Data

Apr. 19, 2005 (DE) .................. 10 2005 018 163

(51) Int. Cl.
*H01Q 3/00* (2006.01)
(52) U.S. Cl. .................. 342/372; 342/169; 342/376; 342/377
(58) Field of Classification Search .................. 342/368, 342/372–373, 376–377, 357.06, 169–172
See application file for complete search history.

(56) References Cited

U.S. PATENT DOCUMENTS

2005/0013351 A1* 1/2005 Paul .......................... 375/150

FOREIGN PATENT DOCUMENTS

EP 940931 A2 * 9/1999

OTHER PUBLICATIONS (N. J. Boasman, P. Briggs: "The Development of an Anechoic GPS Test Facility", Paper presented on ION National Conference, Albuquerque, NM, Jun. 24-26, 2002).

(D. Howell, D. Jacobs, B. Rahn, G. Green: "Virtual Flight Testing—A Versatile Approach to Evaluate Future GPS Anti-Jam Technologies", Proceedings of ION NTM Jan. 26-28, 2000, Anaheim, Ca, USA).

A. Hornbostel, A. Schroth, H. Denks, M. Holbrow: "A New Signal Simulation Tool for Testing of Receivers with Controlled Reception Pattern Antennas", ION 2004, Long Beach, Sep. 21-24, 2004.

A. Hornbostel, A. Schroth, H. Denks, A. Konovaltsev, H. Venus, M. Holbrow: "A New Approach for Testing of Receivers with Controlled Reception Pattern Antennas", Proceedings of Navitec 2004, ESA/ESTEC, Nordwijk, Dec. 8-10, 2004.

P. Bello: "Characterization of Randomly Time-Variant Linear Channels", 360-393, May, 1983.

* cited by examiner

*Primary Examiner*—Thomas H. Tarcza
*Assistant Examiner*—Fred H. Mull
(74) *Attorney, Agent, or Firm*—Collard & Roe, P.C.

(57) ABSTRACT

A signal simulation device for testing and developing radio receivers adapted to orientate antenna beams to different radio transmitters and to simultaneously suppress interference signals, comprises an antenna array, a signal generator generating reproducible digital signals in the complex baseband, and a digital matrix processor combined and synchronized with the signal generator. The processor has input signals generated by the signal generator and has output signals that form received signals of the antenna array. The input signals of the matrix processor are phase shifted according to a direction of incidence and to relative positions of the elements within the antenna array of the radio receiver, and are combined and supplied to outputs of the matrix processor. Amplitude and phase shift are simulated by weighting of the input signals from the signal generator, the weighting coefficients being calculated on a control computer and input into the matrix processor via an interface.

21 Claims, 4 Drawing Sheets

1

SIGNAL SIMULATION DEVICE

TECHNICAL FIELD OF THE INVENTION

The present invention is directed to a signal simulation device for testing and developing radio receivers, in particular satellite navigation receivers, which are adapted to orientate a plurality of independent antenna beams to different signal-emitting radio transmitters and to simultaneously suppress interference signals and which further comprise an adaptively controllable antenna array composed of elements, using a signal generator generating a plurality of reproducible digital signals in the complex baseband and a digital matrix processor combined and synchronized therewith, whose input signals are the digital signals generated by the signal generator in the complex baseband and whose output signals form the received signals of the individual elements of the antenna array of the radio receiver, the input signals of the matrix processor being modulated in the digital portion within this matrix processor by phase shifting according to their direction of incidence and to the relative positions of the elements within the antenna array of the radio receiver, and the phase-shifted signals being combined and supplied to the individual outputs of the matrix processor.

BACKGROUND OF THE INVENTION

In the context of different projects both in the fields of communication and navigation, receivers with adaptive antenna arrays are developed which are adapted to orientate a plurality of independent antenna beams to different transmitters, e.g. to satellites, and to simultaneously suppress interference signals. For testing and designing such receivers, signal simulators are required that allow to generate reproducible signals that can be supplied to the receiver in the laboratory.

One of the main sources of interferences in satellite navigation are multipath signals, i.e. signals that impinge on the antenna of the navigation receiver only after having been reflected once or several times, e.g. by buildings. For satellite navigation, for example, receivers exist that are adapted to generate signals from a plurality of GPS satellites and, in the future, also Galileo satellites. However, these receivers only have relatively limited possibilities to factor multipath propagation in; the output signals include no information on directions.

In order to test an antenna-receiver unit, in particular the adaptive orientation of the antenna beams and the suppressing of interference signals, however, also the direction of incidence of the satellite signals has to be simulated. This can either be done using distributed transmitter antennas in a large anechoic measuring chamber or by means of an additional device, in which the phase shifts between the individual antenna elements are simulated according to the direction of incidence of the satellite signals, i.e. in which a plane wave front is generated for each input signal, which is incident from the direction of the associated satellite. The receiving antenna itself is simulated as well and the simulated signals are fed directly into the receiver input.

Existing signal simulators, e.g. the Spirent STR 4790 (STR 4790 Multi-Output GPS Signal Simulator Product Specification, MS3010, Spirent Communications), are able to generate up to twelve individual GPS satellite signals on two carrier frequencies. Hitherto, these simulators have been used in two ways to test receivers with antenna arrays having adaptively controllable receiving characteristics.

In the first way, in a large anechoic measuring chamber, the RF outputs of the simulators were connected to individual transmitter antennas spatially distributed in the measuring chamber. The receiving unit, i.e. the receiver including the antenna array, was placed on a motion platform. The movement of the satellites was simply simulated by rotating the motion platform (N.J. Boasman, P. Briggs: "The Development of an Anechoic GPS Test Facility", Paper presented on ION National Conference, Albuquerque, N. Mex., 24.-26. Jun., 2002). A simulation using distributed antennas in an anechoic measuring chamber is disadvantageous in that, on the one hand, a rather large measuring chamber is required for far field measuring, which may have dimensions of several meters in all directions, and that, on the other hand, the movement of a satellite can only be simulated imperfectly.

In the second way, the RF outputs from the simulator were supplied to an analog device in which the plane wave fronts were generated using analog phase shifters and attenuating elements. The movements of the satellite and of the user were simulated by readjusting the phase shifters and the attenuating elements. Thus, up to eight antenna elements could be simulated at the output with sixteen input signals (D. Howell, D. Jacobs, B. Rahn, G. Green: "Virtual Flight Testing—A Versatile Approach to Evaluate Future GPS Anti-Jam Technologies", Proceedings of ION NTM 26.-28. Jan. 2000, Anaheim, Calif., USA).

The disadvantage of an analog device for generating the plane wavefronts consists in the high hardware effort for the realization, which increases proportional to the product of the input and output signals. Compared to a digital solution, the analog variant is much less versatile, since modifications always require a new hardware design. An additional multipath channel simulation within this analog unit is not possible.

From A. Hornbostel, A. Schroth, H. Denks, M. Holbrow: "A New Signal Simulation Tool for Testing of Receivers with Controlled Reception Pattern Antennas", ION 2004, Long Beach, 21.-24. Sep., 2004, and from A. Hornbostel, A. Schroth, H. Denks, A. Konovaltsev, H. Venus, M. Holbrow: "A New Approach for Testing of Receivers with Controlled Reception Pattern Antennas", Proceedings of Navitec 2004, ESA/ESTEC, Nordwijk, 8.-10. Dec., 2004, a digitally operating signal simulation tool for testing and developing GNSS receivers, especially for GPS and the future Galileo, is known which are adapted to orient a plurality of independent antenna beams to different signal-emitting radio transmitters and to simultaneously suppress interference signals and which comprise an adaptively controllable antenna array assembled from elements. This known simulation tool, which is also based on the above mentioned signal simulator "Spirent STR 4790", includes a signal generator generating a plurality of digital signals in the complex baseband and a matrix processor.

The input signals of this matrix processor are the digital signals generated in the complex baseband by the signal generator and its output signals form the received signals of the individual elements of the antenna array of the radio receiver. Within the matrix processor, the input signals of the matrix processor are modulated in the digital portion by phase shifting corresponding to their direction of incidence and to the relative positions of the elements within the antenna array of the radio receiver. The phase-shifted signals are then combined and supplied to the individual outputs of the digital matrix processor. The main feature of this simulation tool is the generation of individual digital baseband satellite signals that, using an external digital matrix processor, can be converted to the input signals of the individual elements of an antenna array, the matrix processor performing a wave front generation for each satellite signal, which depends on the direction of incidence, and delivering the combined baseband signals for each antenna element as the output signal.

The output signals from the matrix processor may either be fed directly into a baseband receiver or they can be returned to the signal generator for conversion to RF signals. This simulation tool already allows for the testing and developing of satellite navigation receivers with an adaptively controllable antenna array for orienting a plurality of independent antenna beams in a small laboratory and requires no large anechoic measuring chamber.

SUMMARY OF THE INVENTION

It is an object of the present invention to develop and advantageously embody the latter described signal simulation device primarily with respect to the matrix processor and, in particular, to indicate detailed measures for an implementation of the multipath simulation in the matrix processor.

According to the present invention, which refers to a signal simulation device of the type initially mentioned, this object is achieved in an advantageous manner by configuring the digital matrix processor, which is combined and synchronized with the signal processor, such that by a complex weighting of its input signals from the signal generator, the amplitude and phase shift are simulated that depend on the direction of incidence of the signals and the position of the antenna array element of the receiver that is associated to the output, the weighting coefficients being calculated externally on a control computer and inputted into the matrix processor via an interface, and that for generating additional multipath signals within the digital matrix processor, means are provided to additionally convolute the input signals with the impulse response of a multipath channel, the coefficients of the impulse response being calculated using a vector channel model.

In application to satellite navigation receivers to be tested or developed, for example, which have adaptively controlled antenna beams, the invention is based on a digital processing unit that, in combination with a satellite signal generator, allows to generate the plane wavefronts for each satellite input signal by a complex weighting in the baseband on a digital level, and that simultaneously allows to generate additional multipath signals through a vector channel model. The digital processing unit is configured as a digital matrix processor, whose input signals are the digital individual satellites generated by the signal generator in the complex baseband and whose output signals form, also in the complex baseband, the received signals of the individual elements of the antenna array that generates the antenna beams.

The input signals are combined within the matrix processor and are applied to the individual outputs, wherein, prior thereto, the amplitude and the phase shift, which depend on the direction of incidence of the signals and the position of the antenna element associated to the output, are simulated by a complex weighting of the input signals within the matrix processor. The weighting coefficients are calculated externally on a control computer and fed into the matrix processor via an interface. Within the matrix processor, the input signals are additionally convoluted with the impulse response of a multipath channel to generate the multipath signals. The coefficients of the impulse response are either calculated directly within the matrix processor using a channel model, or using an external digital signal processor, or on the external control computer.

The digital output signals of the matrix processor can be processed either directly in a digital baseband receiver or they can be converted back to analog signals, converted up and be fed into the IF or the RF stage of the receiver.

An advantageous application of the signal simulation device of the present invention is as an additional module of GPS/Galileo signal simulators.

DETAILED DESCRIPTION OF PREFERRED EMBODIMENTS

Figure 1:
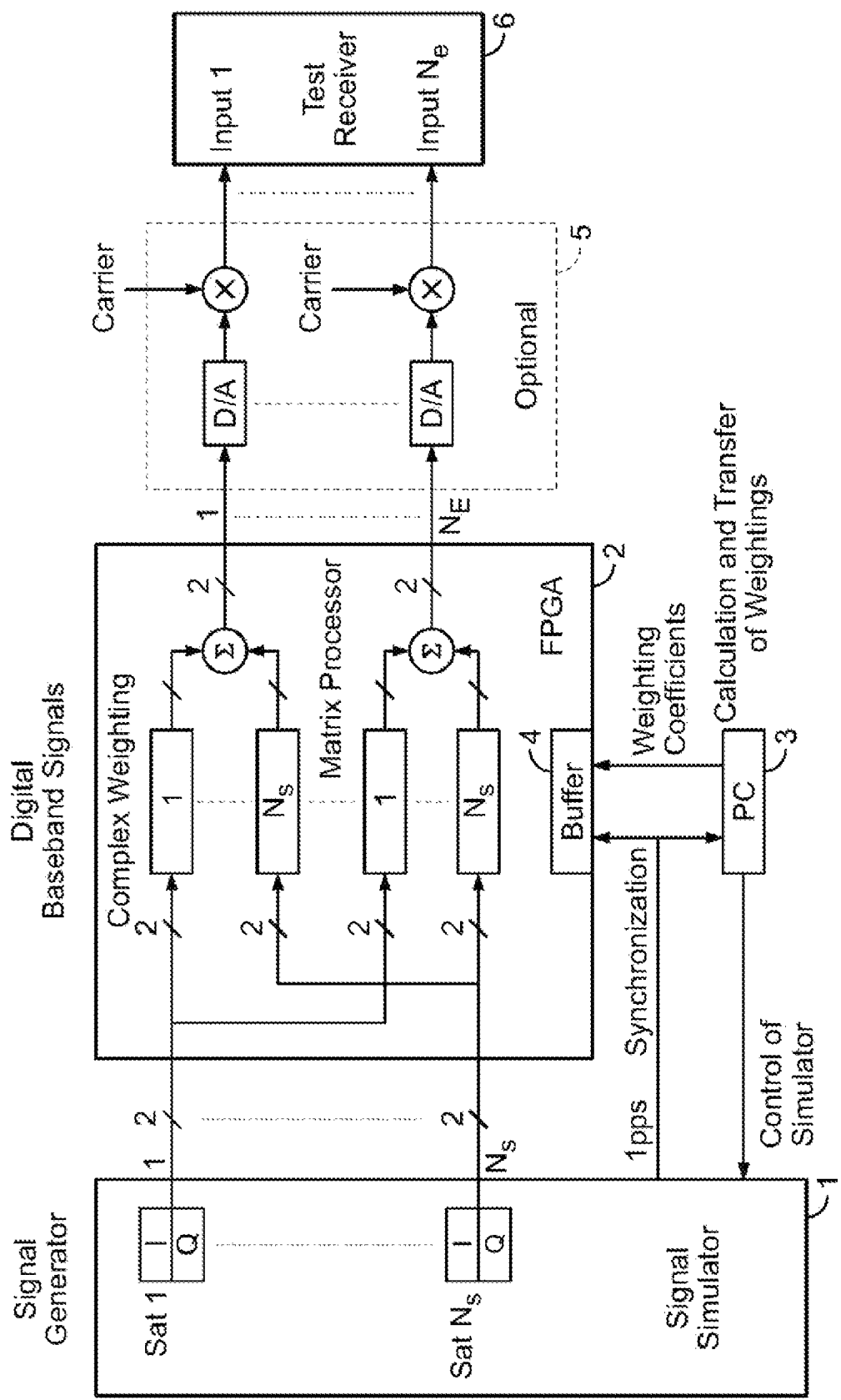
FIG. 1 illustrates, in a block diagram, the principle of a digital wavefront matrix processor in combination with a digital signal generator and a receiver to be tested.
Figure 2:
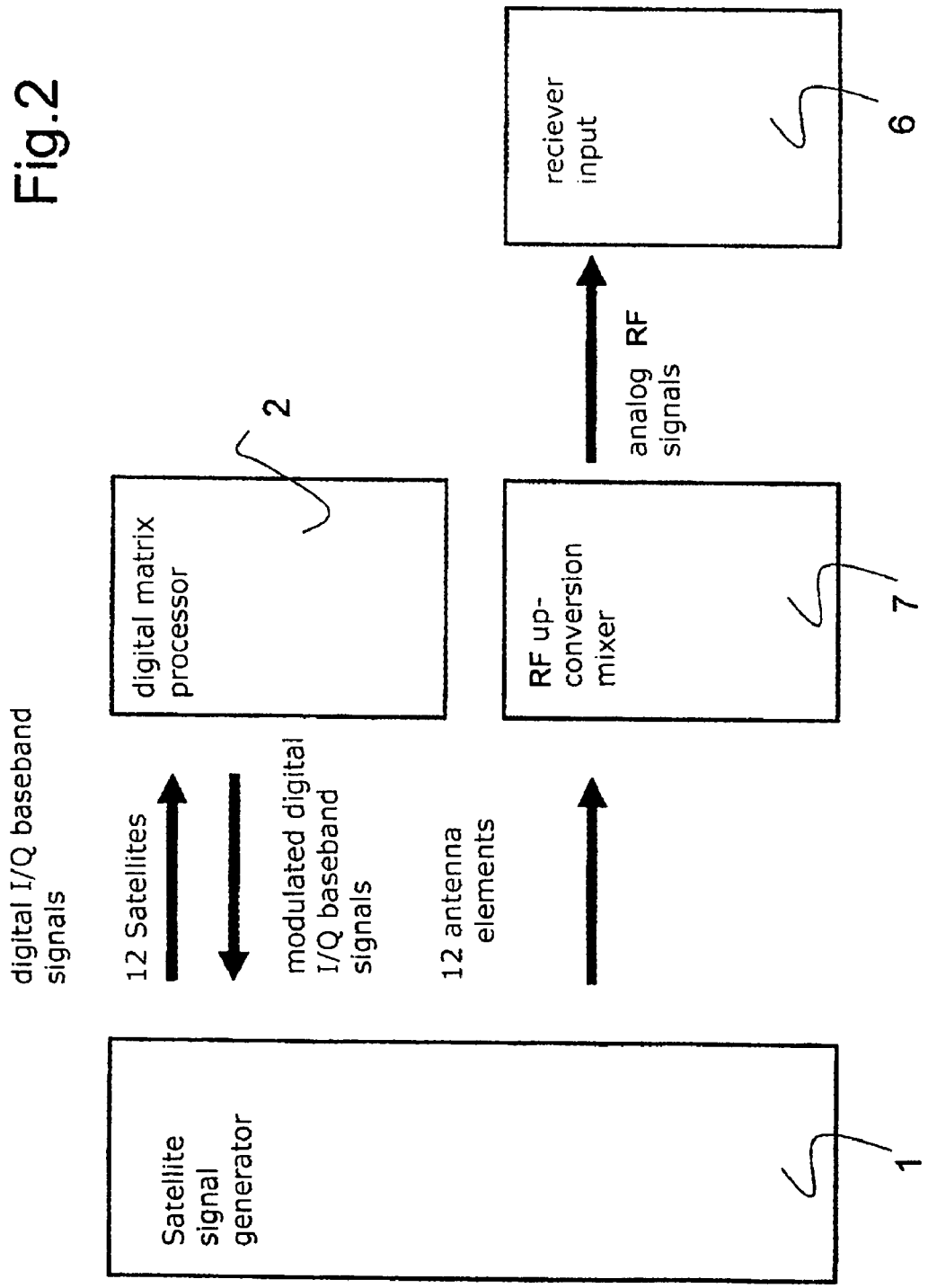
FIG. 2 is a schematic illustration of the feedback of the digital baseband signals from the digital matrix processor and of the generation of analog intermediate-frequency signals in the signal generator and the subsequent RF up-conversion.

Referring to FIG. 1 and FIG. 2, the generation of a wave front performed with a satellite signal simulation device of the present invention will now be described.

Separated by in-phase channel and quadrature channel Q, the digitalized complex baseband signals $(1, \ldots, N_s)$ of a plurality of satellites Sat 1 to Sat $N_s$, generated reproducibly by a signal generator 1, are each fed into digital matrix processor 2 configured from one or more FPGA (Field Programmable Gate Arrays), where they are complexly multiplied by different weighting factors, which, given an adequate choice of weighting factors, corresponds to an adjustment of the amplitude and a shifting of the carrier phase. Thereafter, the signals are combined, i.e. added, and delivered at outputs as digital signals, again split up into in-phase and quadrature components I and Q, respectively.

The matrix processor 2 has a plurality of such outputs, namely one for each antenna array element of a test receiver 6 to be simulated. The output signals $(1, \ldots, N_e)$ at these outputs correspond to the sum of all satellite signals and of possible reflected signals additionally generated in the matrix processor 2 (see FIG. 4) at the outputs of a plurality of elements of the antenna array after down-conversion to the baseband and after digitization. For each input signal $(1, \ldots, N_s)$ and for each output signal $(1, \ldots, N_e)$, different sets of weighting coefficients are calculated that result from the predetermined direction of incidence of the satellite signals and the position of the antenna element, i.e. for each input signal and for each internally generated reflected signal, a plane wavefront is generated that arrives from the direction of the emitting satellite or the last point of reflection.

In the present example, the coefficients for the satellite signals are calculated on a personal computer (PC) 3 depending on the simulated satellite position and the predetermined position and orientation of the user antennas, from where they are supplied to a buffer 4, which in this case is a part of the matrix processor 2, via a data interface, e.g. a USB interface. The buffer 4 is necessary for reading the weighting coefficients into the matrix processor 2 synchronous with the input signals. It uncouples the asynchronous process of transmitting coefficient data from the personal computer 3 to the matrix processor 2 from the synchronous real-time matrix multiplication process. The orbits are supplied by the control software of the satellite signal generator 1 that also runs on the personal computer 3.

The weighting coefficients can be calculated in a prior operation before the actual simulation during which the previously calculated weighting coefficients will then only be transferred. Reading the buffer 4 and transferring data from the personal computer 3 are synchronized by means of a 1-PPS signal (1 pulse per second) which is supplied by the satellite signal generator 1 and is synchronous to the substantially faster cycle of the digital baseband signals which is also transmitted to the matrix processor 2 via the baseband-inputs. The output signals $(1, \ldots, N_e)$ of the matrix processor 2 may be supplied either directly to a test receiver 6 as baseband signals or they can be A/D converted and modulated on an intermediate frequency carrier or a radio frequency carrier in a unit 5 for A/D conversion and up-conversion that precedes the test receiver 6.

Again, the unit 5 suitably is a part of the satellite signal generator 1, see FIG. 2. In FIG. 2, where twelve satellite signals generated in the satellite signal generator 1 and twelve antenna elements of the antenna array of the test receiver 6 are provided, the analog output signals modulated on an IF carrier are then taken from the satellite signal generator 1 and transferred to the RF level by means of a discrete RF up-conversion mixer 7, whereupon they are supplied to the RF receiver input of the test receiver 6 as analog RF signals.

The digital embodiment is advantageous over an analog matrix processor especially, when a high number of input and output signals is to be processed, since several hundred matrix elements can be implemented. At the same time, the digital embodiment is a lot more versatile than analog forms, since, for example, new matrix structures can be implemented by reprogramming the FPGAs. By digitally weighting the signals also at high refreshing rates of 100 Hz or more when calculating the weighting coefficients, further effects can be simulated, such as, for example, fast signal jitters (scintillations) or fading for fast-moving users.

Figure 3:
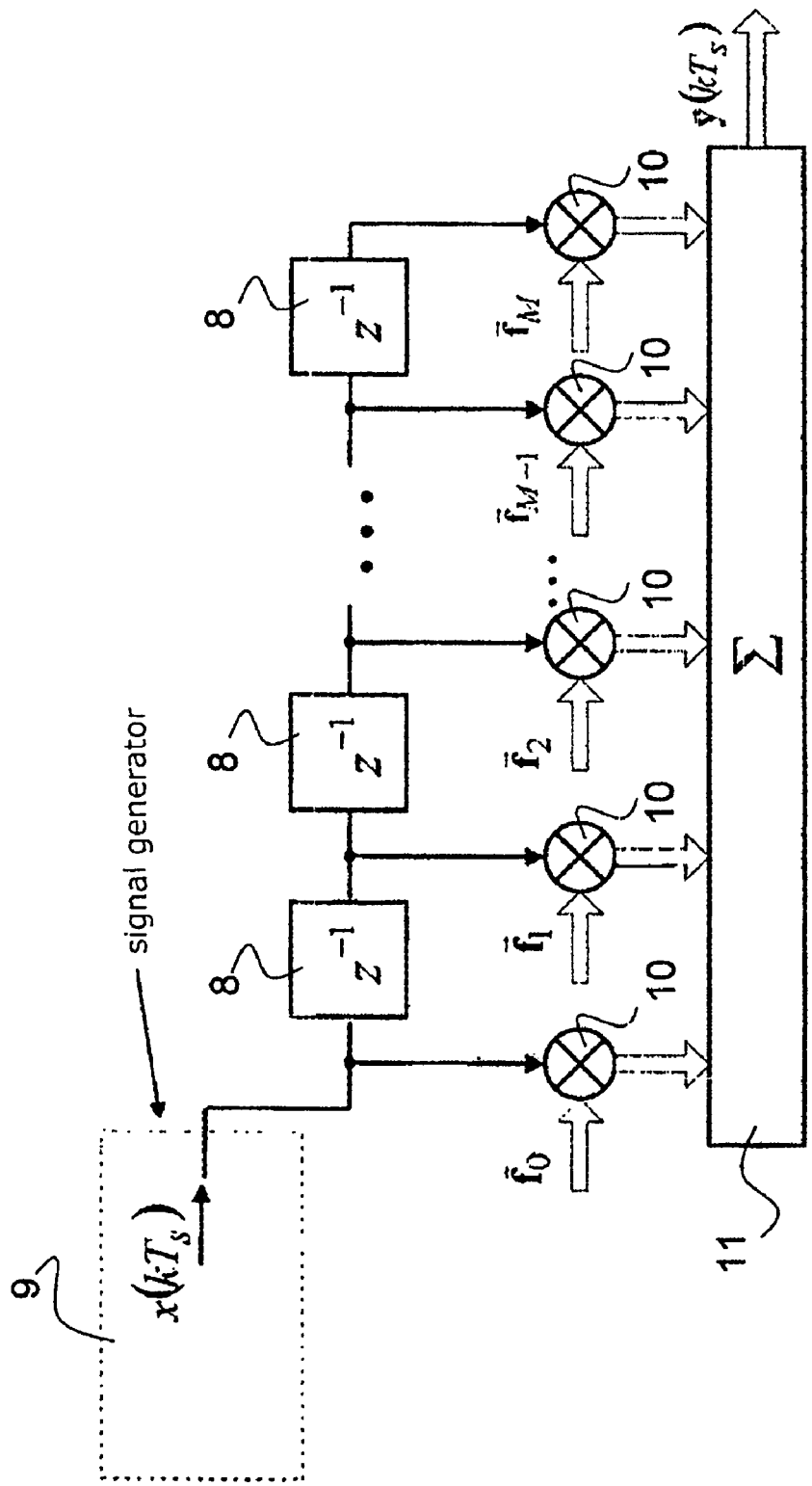
FIG. 3 is a block diagram of a multipath channel simulation with fixed delays and variable coefficients using a tapped delay line according to the present invention.

In carrying out a multipath channel simulation, which will now be explained for the signal simulation device with respect to FIG. 3, it is advantageous to realize the convolution of the input signal with the impulse response of the multipath channels through a tapped delay line with fixed delay elements 8 and variable coefficients. This is based on a WSSUS (Wide-Sense Stationary Uncorrelated Scattering) channel model as described, for example, in the paper by Bello, P.A., "Characterization of Randomly Time-Variant Linear Channels", in IEEE Trans. on Communication Systems, pages 360 to 393, December 1963.

For an implementation, sequences of cyclic signal delays have to be implemented in the FPGA or the FPGAs. The output signal, of the signal generator 9 and the output signals of each of these delay elements 8 are then weighted individually in multipliers 10 and summed in a summator 11. The structure corresponds to the implementation of a FIR (Finite Impulse Response) filter. One should bear in mind that the output signal of the signal generator 9 and the output signals of the individual delay elements 8 are multiplied by weighting vectors $\vec{f}$ whose number of elements corresponds to the number of antenna elements of the antenna array of the test receiver.

The number M of the delay elements 8 is higher than the number of echoes and results from the duration of the impulse response and the signal bandwidth, the duration of the maximum delay and the signal sampling rate. To generate a vector channel, $N_e$ of such structures have to be generated, where $N_e$ is the number of antenna elements in the antenna array. The complex elements of all weighting vectors $\vec{f}$ are the sampling values of the vector impulse response of the multipath channel. They include both the information for a channel impulse response and the direction information on the individual input signals.

Figure 4:
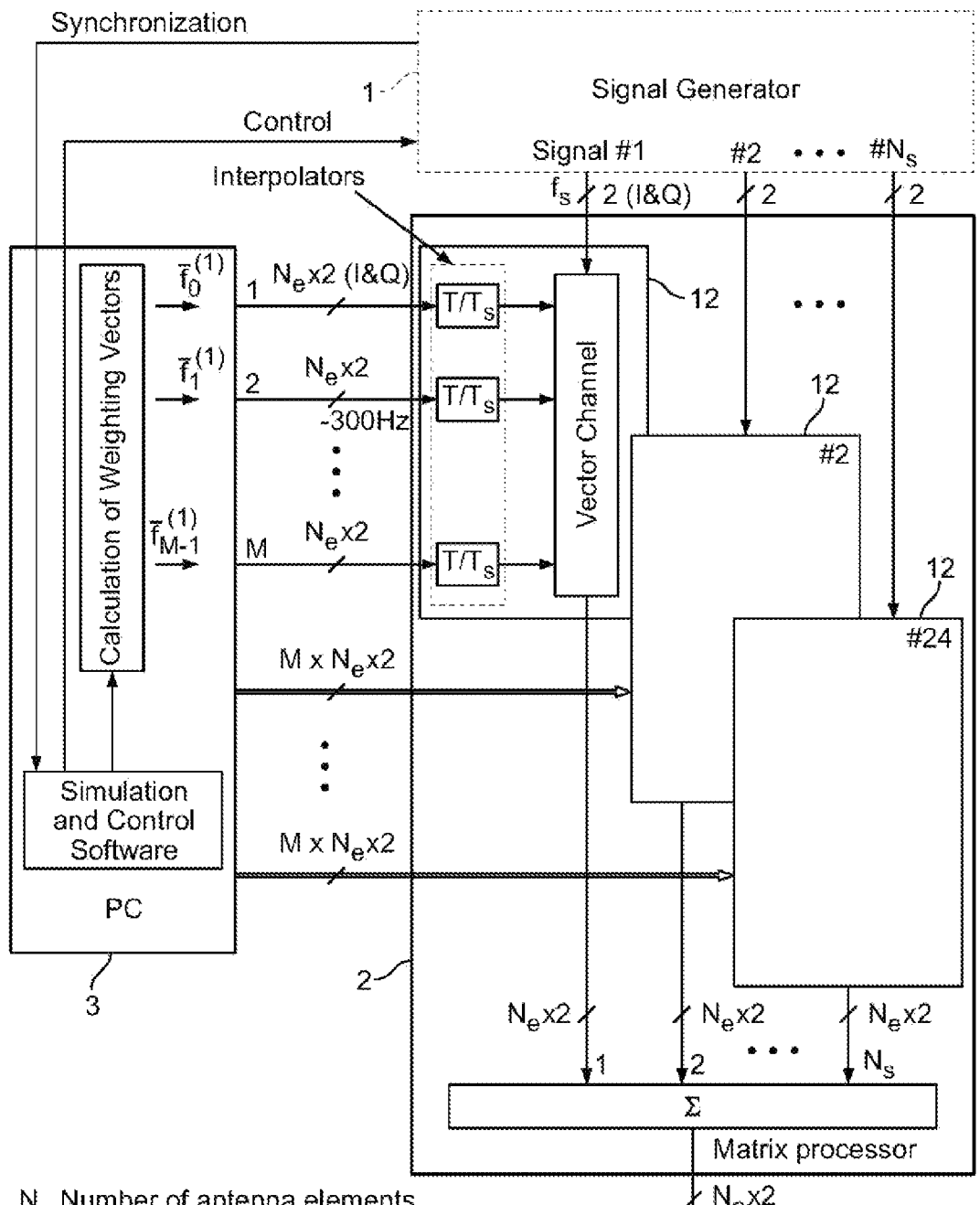
FIG. 4 is a block diagram of the principle of the present invention pertaining to an extended digital wavefront matrix processor with integrated multipath vector channel simulation in combination with a personal computer, a digital signal generator and a receiver to be tested.

With reference to FIG. 4, the following describes a complete matrix processor 2 with vector channel simulation and wavefront generation of a signal simulation device according to the present invention.

The interconnection of the signal simulator 1, the digital matrix processor 2, the personal computer (PC) 3, the digital/analog converter and mixer stage 5 and the test receiver 6 corresponds to that of FIG. 1. However, the matrix processor 2 is extended by vector channel modules 12, each associated to an input signal $(1, \ldots, N_s)$. Each vector channel module 12 comprises $N_e$ FIR filters corresponding to FIG. 3. Here, the personal computer 3 not only calculates the weighting coefficients, but also the weighting vectors $\vec{f}$.

The length of these weighting vectors $\vec{f}$, i.e. the number of the complex elements of each weighting vector $\vec{f}$, is equal to the number of antenna elements. A complete set comprising M of such vectors has to be generated for each antenna element of the antenna array of the test receiver 6 and in consideration of each input signal $(1 \ldots, N_s)$, where M is the number of elements of the FIR filter.

The present signal simulation device for testing and developing radio receivers is thus characterized by the practical combination of a digital matrix processor for wavefront generation, which generates the output signals of individual elements of an antenna array from the weighting and combination of the individual satellite input signals, and of the additional internal generation of multipath signals using a vector channel model.

Different from existing solutions to the problem of wavefront generation from analog radio-frequency signals, the present signal simulation device for testing and developing radio receivers realizes the generation of wavefronts by a complex weighting of the baseband signals. This allows for a digital implementation, since the baseband signals can be generated digitally also with relatively large bandwidths (approx. 50 MHz) at a sufficient sampling rate (50-100 MHz when sampling the I and Q channels). The advantages of the digital realization are a high versatility and the possibility to realize large matrices having a high number of inputs and outputs. In fact, it is the digital realization that allows for an additional implementation of a vector channel simulation according to the invention.

The present signal simulation device for testing and developing radio receivers is also characterized by a novel feedback of the output signals of the digital wavefront matrix to the satellite signal generator for the generation of radio-frequency signals. For this purpose, the satellite signal generator must have the corresponding inputs and outputs in the baseband.

The invention claimed is:

1. A signal simulation device for testing and developing radio receivers which are adapted to orientate a plurality of independent antenna beams to different signal-emitting radio transmitters and to simultaneously suppress interference signals, comprising:

an adaptively controllable antenna array composed of individual elements;

a signal generator generating a plurality of reproducible digital signals in the complex baseband;

a digital matrix processor combined and synchronized with the signal generator, said processor having input signals comprising the digital signals generated by the signal generator in the complex baseband and having output signals that form received signals of the individual elements of the antenna array of the radio receiver, wherein the input signals of the matrix processor are modulated in the digital portion within the matrix processor by phase shifting according to a direction of incidence and to relative positions of the elements within the antenna array of the radio receiver, wherein the phase-shifted signals are combined and supplied to the individual outputs of the matrix processor, wherein the digital matrix processor, which is combined and synchronized with the signal processor, is configured such that amplitude and phase shift that depend on a direction of incidence of the signals and a position of the antenna array element of the receiver that is associated to the output, are simulated by a complex weighting of the input signals from the signal generator, the weighting coefficients being calculated externally on a control computer and input into the matrix processor via an interface, and wherein for generating additional multipath signals within the digital matrix processor, means are provided to additionally convolute the input signals with an impulse response of a multipath channel, coefficients of the impulse response being calculated using a vector channel model.

2. The signal simulation device of claim 1, wherein the control computer calculates the weighting coefficients, said computer being connected to the matrix processor through the interface.

3. The signal simulation device of claim 2, wherein said external control computer is a personal computer.

4. The signal simulation device of claim 2, wherein said data interface is a USB interface.

5. The signal simulation device of claim 2, wherein a buffer is provided for synchronously reading the weighting coefficients into the matrix processor, said buffer being connected to said control computer through said data interface and decoupling the asynchronous coefficient data transmission process from the synchronous real-time matrix multiplication process.

6. The signal simulation device of claim 5, wherein said buffer is a part of said matrix processor.

7. The signal simulation device of claim 5, wherein reading the buffer and the data transfer from the control computer are synchronized through a 1-PPS (pulse per second) signal which is supplied by said signal generator and is synchronous to a substantially faster clock of the digital baseband signals that is also supplied to said matrix processor through the baseband inputs.

8. The signal simulation device of claim 7, wherein, for realizing the delay elements, sequences of cyclic signal delays are implemented in the FPGA (Field Programmable Gate Array) or in the FPGAs, respectively.

9. The signal simulation device of claim 7, wherein, for realizing an integrated multipath vector channel simulation, said matrix processor is extended by vector channel modules each associated to a respective input signal $(1, \ldots, N_s)$, each vector channel module consisting of $N_e$ FIR filters, wherein not only the weighting coefficients but also the weighting vectors $\vec{t}$ are calculated on said control computer, the number of complex elements of each weighting vector $\vec{t}$, is equal to the number of antenna elements, and wherein a complete set with M such weighting vectors is generated for each antenna element of the antenna array of the receiver and in consideration of each input signal $(1, \ldots, N_s)$, where M is the number of elements of the FIR filter.

10. The signal simulation device of claim 2, wherein said digital matrix processor is configured from one or a plurality of FPGAs (Field Programmable Gate Arrays).

11. The signal simulation device of claim 1, wherein coefficients of a vector impulse response are calculated directly within said matrix processor using the vector channel model.

12. The signal simulation device of claim 1, wherein coefficients of a vector impulse response are calculated by means of the vector channel model using an external digital signal processor.

13. The signal simulation device of claim 1, wherein coefficients of a vector impulse response are calculated on said external control computer by means of the vector channel model.

14. The signal simulation device of claim 1, wherein the digital output signals of said matrix processor are processed directly in a digital baseband receiver stage of the receiver.

15. The signal simulation device of claim 1, wherein a unit for digital/analog conversion and up-conversion mixing converts the digital output signals of said matrix processor into analog signals, up-converts them and feeds them into an IF or RF stage of said receiver.

16. The signal simulation device of claim 1, wherein said digital matrix processor is configured from one or a plurality of FPGAs (Field Programmable Gate Arrays).

17. The signal simulation device of claim 1, wherein, for each input signal $(1, \ldots, N_s)$ and for each output signal $(1, \ldots, N_e)$ of said matrix processor, different sets of weighting coefficients are calculated which result from the predetermined directions of incidence of the directly incident signals and the reflected signals and a plane wavefront is calculated for each input signal and internally generated reflected signal, which wavefront is incident from the direction of the directly incident signal or the last reflection point of the reflected signal, the calculation of the coefficients for the signals being effected on the control computer depending on the signals emission position and the predetermined position and orientation of the antenna array beams.

18. The signal simulation device of claim 1, wherein the calculation of the weighting coefficients in the control computer is effected in a preliminary run prior to the actual simulation operation in which the pre-calculated weighting coefficients are only transferred.

19. The signal simulation device of claim 1, wherein convolution with a vector impulse response of the multipath channel is realized through a tapped delay line with fixed delay elements and variable coefficients, a WSSUS (Wide-Sense Stationary Uncorrelated Scattering) channel model forming the basis thereof, wherein the output signal of the signal generator and the output signals of each of these delay elements are individually weighted in multipliers and summed in a summator, the structure corresponding to the implementation of a FIR (Finite Impulse Response) filter, wherein the output signal of the signal generator and the output signals of the individual delay elements are multiplied by weighting vectors $\vec{t}$ whose number of elements corresponds to the number of antenna elements of the antenna array of the test receiver, where the number (M) of the delay elements is higher than the number of echoes and results from the duration of the impulse response and the signal bandwidth, the duration of the maximum delay and the signal sampling rate, wherein $N_e$ of such structures are generated to form a vector channel, where $N_e$ is the number of antenna elements of the antenna array, and wherein the complex elements of all weighting vectors $\vec{c}_i$ are sampling values of the vector impulse response of the multipath channel and include both the information for a channel impulse response and the direction information on the individual input signals.

20. Use of the signal simulation device of claim 1 in the context of a GPS satellite signal simulator.

21. Use of the signal simulation device of claim 1 in the context of a Galileo satellite signal simulator.

* * * * *